United States Patent [19]

Rutishauser

[11] 4,365,270
[45] Dec. 21, 1982

[54] DUAL STANDARD VERTICAL DEFLECTION SYSTEM

[75] Inventor: Ernst A. O. Rutishauser, Widen, Switzerland

[73] Assignee: RCA Corporation, New York, N.Y.

[21] Appl. No.: 135,557

[22] Filed: Mar. 31, 1980

[30] Foreign Application Priority Data

Aug. 23, 1979 [GB] United Kingdom ............... 7929379

[51] Int. Cl.³ .............................................. H04N 5/02
[52] U.S. Cl. .................................................. 358/140
[58] Field of Search ........................... 358/11, 140, 148

[56] References Cited

U.S. PATENT DOCUMENTS

| 2,668,193 | 2/1954 | Chapin et al. | 358/140 |
| 3,182,124 | 5/1965 | Nurse | 358/140 |
| 3,839,649 | 10/1974 | Morio | 307/233 A |

FOREIGN PATENT DOCUMENTS

| 2175038 | 10/1973 | France . |
| 1102583 | 7/1968 | United Kingdom . |
| 972303 | 10/1974 | United Kingdom . |

OTHER PUBLICATIONS

"Valvo Brief/Hannover 1979/Informationen zur Messe", 4-18-79, p. 10.

Primary Examiner—Richard Murray
Attorney, Agent, or Firm—Paul J. Rasmussen; William H. Meagher; Scott J. Stevens

[57] ABSTRACT

Dual standard TV receiver includes means for identifying field frequency of received TV signals. A switching system responsive to output of field frequency identifying means alters circuitry of receiver's vertical deflection system in a manner maintaining same picture height for received signals of differing field frequencies. Circuitry alteration additionally effects appropriate alteration of free-running frequency of oscillator.

4 Claims, 1 Drawing Figure

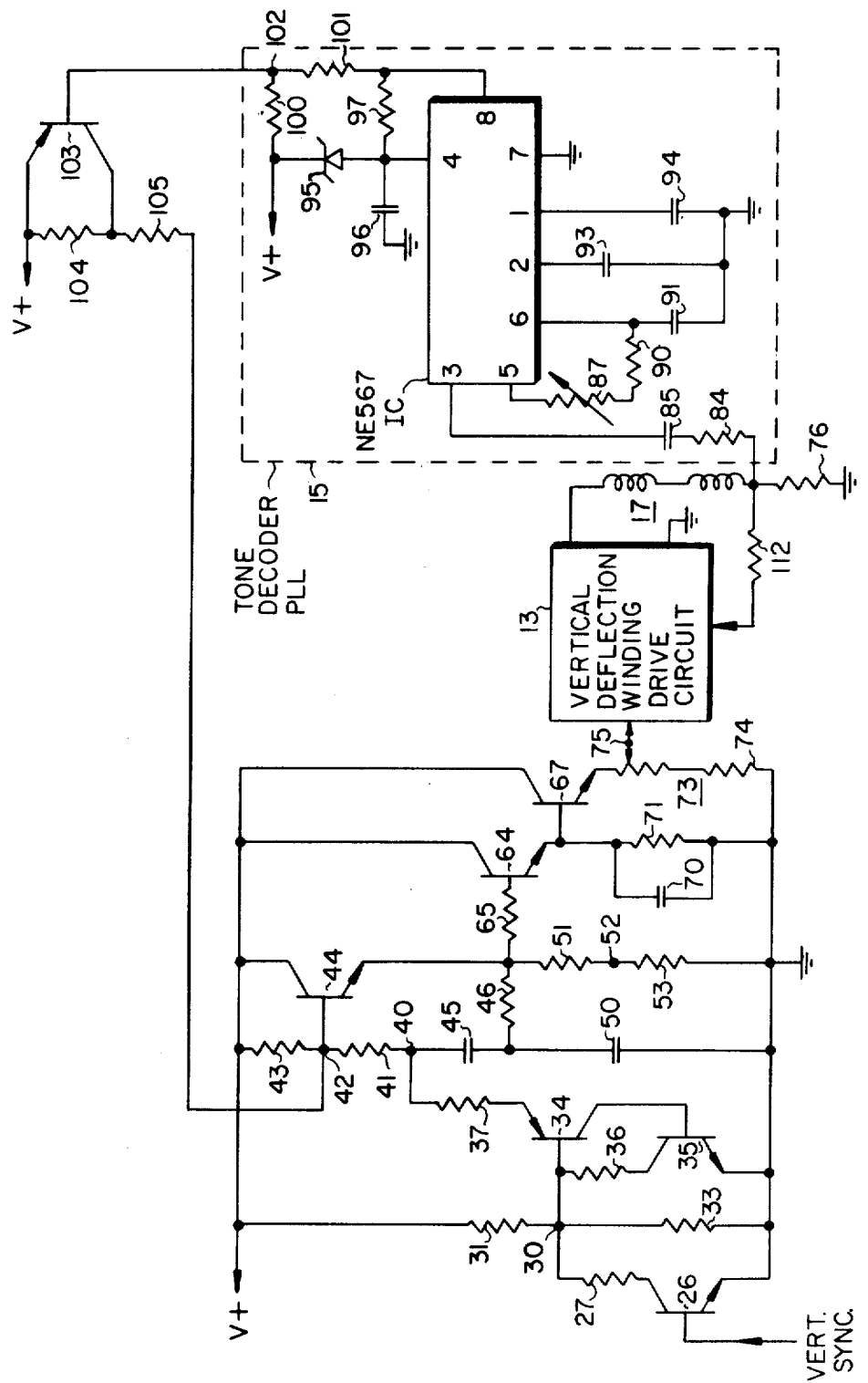

DUAL STANDARD VERTICAL DEFLECTION SYSTEM

This invention relates to dual standard television receivers and in particular to a television receiver arrangement in which vertical deflection circuit parameters are automatically adjusted in dependence upon the scanning standards of the television signal being received so that the receiver may present a proper image display in response to signals of differing scanning standards.

With the advent of home video tape players and video disc players, there is an increased diversity of program sources available for supply of image information to a television receiver. If the receiver is provided with the facility for proper image display in response to television signals developed under differing scanning standards, the flexibility of use of the receiver is enhanced. Of main concern, in this regard, is the ability to provide proper image display in response to: (a) television signals of the type having a line frequency of 15,625 Hz. and a field frequency of 50 Hz., and (b) television signals of the type having a line frequency of approximately 15,750 Hz. and a field frequency of approximately 60 Hz. (The latter type being viewed as inclusive of signals of the type where line frequency is particularly 15,734.26 Hz. and field frequency is particularly 59.94 Hz.).

Most commercially available (single-standard) television receivers designed for normal operation in response to signals of type (a) above, when supplied with signals of type (b), operate as follows: (1) in view of the close similarity of line frequencies, properly synchronized operation of the receiver's horizontal deflection system is achieved, and image display is effected with proper picture width; (2) properly synchronized operation of the receiver's vertical deflection system is achieved, but image display is effected with an objectionable reduction in picture height (of the order of 10% to 20%). In others of such commercially available receivers, the picture height reduction problem is accompanied by occasional inability to achieve properly timed vertical triggering (with the latter problem subject to remedy by vertical hold adjustment, but only if such a facility is incorporated in the receiver design).

The present invention is directed to receiver arrangements automatically effecting deflection circuit parameter adjustments in appropriate dependence upon the scanning standards of the signal being received so as to permit properly synchronized image displays of proper picture dimensions in response to signals of differing scanning standards.

In accordance with the principles of the present invention, the receiver arrangement includes means for identifying the field frequency of the received signals, and means responsive to the output of the field frequency identifying means for altering the circuitry of the vertical deflection system in a manner appropriate to ensuring development of a properly synchronized image display of a desired picture height for received signals of differing field frequencies.

In accordance with an illustrative embodiment of the present invention, a tone decoder phase locked loop (PLL) is rendered responsive to the voltage developed across a sampling resistor in the path of the receiver's vertical scanning current. The PLL is tuned to exhibit a first output state when the fundamental frequency of the vertical deflection sawtooth waveform variations corresponds to the (50 Hz.) field frequency of signals of type (a) above, and to exhibit a second output state when the fundamental frequency of the vertical deflection sawtooth waveform variations corresponds to the (60 Hz.) field frequency of signals of type (b) above. A switch is associated with elements forming the capacitor charging impedance of a sawtooth wave generator whose output controls the timing and amplitude of the sawtooth current waves energizing the vertical deflection windings. The switching state of the switch is rendered responsive to the PLL output state in such manner that when the lower (50 Hz.) field frequency is identified, the effective charging impedance is of a given magnitude, whereas, when the higher (60 Hz.) field frequency is identified, the effective charging impedance is altered to a second magnitude, lower than said given magnitude. With proper proportioning of the respective impedance magnitudes, the amplitude of the sawtooth generator output at the higher triggering rate substantially matches the amplitude of the sawtooth generator output at the lower triggering rate.

Advantageously, this technique of amplitude control can also effect an appropriate alteration in the free running frequency of a vertical oscillator regeneratively associated with the capacitor charging circuit, whereby reliable synchronization of the oscillator by vertical synchronizing pulses at the respective field frequencies can be assured.

In the sole FIGURE of the accompanying drawing, there is shown, partially schematically and partially by block representation, a dual-standard television receiver vertical deflection system incorporating parameter control apparatus embodying the principles of the present invention.

In the illustrated vertical deflection circuitry, a capacitor charging circuit includes a first charging resistor 43, a second charging resistor 41, a capacitor 45, and a capacitor 50, serially connected in the order named between the positive terminal (V+) and the negative terminal (illustratively, ground) of a unidirectional voltage supply. A discharging path for the capacitors includes the series combination of a small value resistor 37, the emitter-to-collector path of a PNP discharge transistor 34, and the base-to-emitter path of an NPN transistor 35, with the series combination connected between the junction (40) of resistor 41 and capacitor 45 and ground. Biasing for the base of transistor 34 is provided by a voltage divider formed by resistors 31 and 33, serially connected between the V+ terminal and ground, with the junction (30) of the resistors directly connected to the base of transistor 34. Regenerative coupling of transistors 34 and 35 is provided via a resistor 36 connected between the collector of transistor 35 and the base of transistor 34.

Resistor 33 is shunted by the series combination of a resistor 27 and the collector-to-emitter path of an NPN transistor 26, which receives at its base positive-going vertical synchronizing pulses derived from a received composite video signal by the receiver's sync separator circuitry (not shown).

An NPN transistor 44 is disposed as an emitter-follower, with its collector connected to the V+ supply terminal, its base directly connected to the junction (42) of charging resistors 43 and 41, and its emitter returned to ground via serially connected resistors 51 and 53. For conventional S-correction purposes, an additional charging path for capacitor 50 is provided via a resistor 46 connected between the emitter of transistor 44 and the junction of capacitors 45 and 50. The junction (52) of resistors 51 and 53 provides a takeoff point for an input to the receiver's vertical blanking circuitry (not shown).

The output of emitter-follower 44 is coupled via a resistor to the base of an NPN transistor 64, disposed as an emitter-follower, with its collector connected to the V+ supply terminal and its emitter returned to ground via a resistor 71, shunted by a capacitor 70. The emitter of transistor 64 provides a takeoff point for an input to the receiver's east-west (side) pincushion correction circuits (not shown). An output emitter-follower is formed by an NPN transistor 67, with its base directly connected to the emitter of transistor 64, with its collector connected to the V+ supply terminal, and with its emitter returned to ground via the series combination of the resistive element of a height control potentiometer 73 and a resistor 74.

At the adjustable tap of potentiometer 73 appears an S-corrected sawtooth wave of adjustable magnitude, which is delivered to an input terminal (75) of the vertical deflection winding drive circuit 13 (for which schematic details are not shown). The drive circuit 13 supplies an output current (controlled in timing, waveshape, and amplitude by the input at terminal 75) to the series combination of the vertical deflection windings 17 of the receiver's deflection yoke and a vertical scanning current sampling resistor 76. Feedback of the voltage across resistor 76 to drive circuit 13, for conventional linearizing purposes, is provided via a feedback resistor 112.

The circuitry of the illustrated vertical deflection system, as thus far described, is of a conventional form. The charging circuit elements 43, 41, 45, 50 cooperate with elements 31, 33, 34, 35, 36, 37 in a regenerative fashion to form a vertical oscillator. Illustratively, the free-running frequency of the oscillator is less than 50 Hz. (e.g., 43 Hz.), and is readily subject to synchronized operation at 50 Hz., when vertical synchronizing pulses from a signal of type (a) above are supplied to transistor 26. Between synchronizing pulse appearances, transistors 34 and 35 are non-conducting, and capacitors 45 and 50 are charged via resistors 43 and 41 in series. When a sync pulse appearance causes transistor 26 to conduct, transistor 34 is biased into conduction turning on transistor 35 which latches transistor 34 in a conducting mode. Discharge of capacitors 45 and 50 via discharge path elements 37, 34, 35 continues until the potential at junction 40 drops sufficiently low to cut off transistor 34. The charging portion of the cycle then recommences.

Now to be described are the additional circuit elements of the illustrated system which provide the vertical deflection circuitry with its desired dual-standard capabilities.

A tone decoder phase-locked-loop (PLL 15) of a conventional design receives as an input (via the series combination of a resistor 84 and capacitor 85) the voltage across the scanning current sampling resistor 76. For illustrative schematic details, PLL 15 is shown as employing a Signetics Type NE567 integrated circuit with external circuit connections, as follows: respective capacitors 91, 93, 94 and 96 linking chip terminals 6, 2, 1 and 4, respectively, to ground; chip terminal 7 directly grounded; chip terminal 4 connected via zener diode 95 to the V+ supply terminal; resistor 97 interconnecting chip terminals 4 and 8; the series combination of variable resistor 87 and resistor 90 interconnecting chip terminals 5 and 6; chip output terminal 8 connected to the V+ supply terminal via the series combination of resistors 101 and 100; and chip input terminal 3 accepting the input from sampling resistor 76.

Variable resistor 87 is illustratively adjusted to provide 60 Hz. tuning for PLL 15, whereby PLL 15 is activated when the fundamental frequency of the scanning waveform sampled by resistor 76 corresponds to the field frequency (approximately 60 Hz.) of a signal of type (b) above, and the voltage at chip output terminal 8 goes "low" under such conditions. In contrast, when the fundamental frequency of the sampled scanning waveform corresponds to the type (a) field frequency (50 Hz.), PLL 15 is not activated, and the voltage at the chip output terminal 8 goes "high".

A PNP switching transistor 103 is disposed with its base connected to the junction (102) of the PLL output resistors 100 and 101, with its emitter connected to the V+ supply terminal, and with its collector connected via a resistor 105 to the junction 42 of charging resistors 43 and 41. A resistor 104 shunts the emitter-to-collector path of transistor 103.

When chip terminal 8 goes low, transistor 103 is switched into a saturated state, effectively shorting out resistor 104. Under these circumstances, charging resistor 43 is shunted by the impedance of resistor 105 alone. When chip terminal 8 goes high, however, transistor 103 is switched into a non-conducting state, whereby charging resistor 43 is shunted by the higher impedance of the series combination of resistors 104 and 105.

Thus, when the vertical oscillator is synchronized for 60 Hz. operation by synchronizing pulses from type (b) signals, the effective charging impedance in the main charging path for capacitors 45 and 50 is lowered in magnitude relative to the effective charging impedance magnitude presented in the main charging path when the oscillator is synchronized for 50 Hz. operation by synchronizing pulses from type (a) signals. By proper resistor proportioning, the charging impedance alteration can be made to just compensate for the effect on sawtooth amplitude of the reduction in charging time, whereby the same sawtooth amplitude is obtained for both 50 Hz. and 60 Hz. operation.

The charging impedance alteration also has the beneficial effect of raising the free-running frequency of the vertical oscillator when shifting from 50 Hz. operation to 60 Hz. operation. With illustrative resistor choices, the free-running frequency shift is from 45 Hz. (when switching transistor 103 is off, and the series combination of resistors 104, 105 shunts charging resistor 43) to 54 Hz. (when switching transistor 103 shorts out resistor 104). Such a frequency shift assures efficiency of synchronization for both modes of operation, and can avoid undesirable rolling effects that might otherwise accompany a momentary loss of synchronizing information when operating at the higher field frequency.

In the invention embodiment described above, the (transistor 103) switching system that responds to the field frequency identifier (PLL 15) controls charging impedance magnitude to effect the desired sawtooth amplitude compensation. Alternatives to the charging impedance control are possible, including the following: (1) controlling the magnitude of the unidirectional charging potential supplied to the charging network 43, 41, 45, 50 (as by dropping the V+ supply potential via a dropping resistor during 50 Hz. operation, and shorting the dropping resistor with a switching device during 60 Hz. operation); (2) effecting switch control of impedance in shunt or series with the height control potentiometer 73; (3) effecting switch control of impedance in shunt or series with the sampling resistor 76; and (4) effecting switch control of impedance in shunt or series with feedback resistor 112.

In the use of alternatives (2), (3), and (4), it will be noted that amplitude compensation is effected at a point in the system subsequent to pincushion correction drive takeoff. Under such circumstances, optimum drive for the pincushion corrector can be provided for only one of the two field frequency standards. It may also by noted that the advantageous shift of the vertical oscillator free-running frequency provided by the illustrated embodiment does not accompany the amplitude compensation when effected by alternatives (2), (3) and (4). Alternative (1) is less power efficient than the illustrated embodiment. A simple transistor switch will not be sufficient for alternative (4), which requires a bidirectional switching device (e.g., a microrelay).

In the illustrated embodiment, sampling resistor 76 provides a convenient, low impedance source of input drive for the field frequency identifying PLL 15. However, when the sampling resistor is used as such a source, the oscillator should be capable of being reliably triggered by the higher frequency synchronizing pulses with transistor 103 in either of its switching states. An alternative source of input drive for PLL 15 comprises the sync separator circuits of the receiver. While use of such an alternative source can assure achievement of field frequency identification with independence of the oscillator locking characteristics, more complex coupling circuitry (e.g., inclusive of an impedance transforming stage, such as an emitter-follower) will typically be required.

Illustrative parameter values for the circuitry of the drawing comprise the following:
Resistor 27 . . . 1.8 kilohms
Resistor 31 . . . 1.8 kilohms
Resistor 33 . . . 2.2 kilohms
Resistor 36 . . . 68 ohms
Resistor 37 . . . 27 ohms
Resistor 41 . . . 10 kilohms
Resistor 43 . . . 82 kilohms
Resistor 46 . . . 6.8 kilohms
Resistor 51 . . . 4.7 kilohms
Resistor 53 . . . 4.7 kilohms
Resistor 65 . . . 470 ohms
Resistor 71 . . . 10 kilohms
Resistor 74 . . . 4.7 kilohms
Resistor 76 . . . 1 ohm
Resistor 84 . . . 1 kilohm
Resistor 87 . . . 2 kilohms (max.)
Resistor 90 . . . 10 kilohms
Resistor 97 . . . 39 kilohms
Resistor 100 . . . 2.2 kilohms
Resistor 101 . . . 22 kilohms
Resistor 104 . . . 1.5 megohms
Resistor 105 . . . 330 kilohms
Resistor 112 . . . 10 kilohms
Potentiometer 73 . . . 5 kilohms
Capacitor 45 . . . 0.68 microfarads
Capacitor 50 . . . 0.68 microfarads
Capacitor 70 . . . 82 nanofarads
Capacitor 85 . . . 0.33 microfarads
Capacitor 91 . . . 1.5 microfarads
Capacitor 93 . . . 10 microfarads
Capacitor 94 . . . 22 microfarads
Capacitor 96 . . . 22 microfarads

What is claimed is:

1. In an image display system for alternatively (1) displaying images in response to composite video signals having a first field frequency and inclusive of vertical synchronizing pulses having a first repetition rate corresponding to said first field frequency, and (2) displaying images in response to composite video signals having a second field frequency, higher than said first field frequency, and inclusive of vertical synchronizing pulses having a second repetition rate corresponding to said second field frequency; a vertical deflection system comprising:

a vertical deflection winding;

means, subject to synchronization by the vertical synchronizing pulses of composite video signals applies to said image display system, comprising oscillator means incorporating a capacitor and charging impedance therefor, for developing vertical scanning current waves for passage through said deflection winding; said current waves having a fundamental frequency corresponding to the repetition rate of the vertical synchronizing pulses effecting synchronization of said developing means; said developing means having a free running frequency lower than said first repetition rate in the absence of said synchronizing pulses;

identifying means, responsive to the field frequency of said current waves for developing an output voltage of a first level when said current waves have said first field frequency, and an output voltage of a second level, different from said first level, when said current waves have said second field frequency;

a switching device, responsive to the output voltage of said identifying means, and exhibiting a first switching state when said output voltage is at said first level, and exhibiting a second switching state when said output voltage is at said second level; and means responsive to the switching state of said switching device, for altering said capacitor charging impedance of said developing means, in dependence upon said switching state, in such manner that the amplitude of the current waves developed during synchronization of said developing means by pulses of said first repetition rate substantially matches the amplitude of the current waves developed during synchronization of said developing means by pulses of said second repetition rate; said altering means also simultaneously increasing the free running frequency of said developing means to improve synchronization of said developing means by synchronizing pulses of said second repetition rate.

2. Apparatus in accordance with claim 1, wherein said oscillator includes:
a source of charging potential;
a capacitance;
a charging resistor; and
means for coupling said capacitance and said charging resistor in series across said source of charging potential;
wherein said switching device comprises a transistor having base, emitter and collector electrodes, with said base electrode rendered responsive to said output voltage;

wherein said parameter altering means includes a pair of resistors connected to form a series combination, with said series combination connected in shunt with said charging resistor, and means for connecting the emitter-collector path of said transistor in shunt with one of said pair of resistors.

3. Apparatus in accordance with claim 2, wherein said oscillator also includes a selectively enabled capacitance discharge path shunting said capacitance;

said apparatus also including means for selectively enabling said discharge path in response to the occurrence of one of said vertical synchronizing pulses.

4. Apparatus in accordance with claim 1, also including a scanning current sampling resistor serially connected with said deflection winding in the path of said current waves; and wherein said identifying means has an input terminal rendered responsive to the voltage appearing across said sampling resistor.

* * * * *